United States Patent
Oda et al.

(10) Patent No.: US 6,486,084 B2
(45) Date of Patent: Nov. 26, 2002

(54) COMPOSITE MATERIAL AND METHOD OF PRODUCING THE SAME

(75) Inventors: Toshio Oda, Nishikasugai-Gun (JP); Hiromichi Kobayashi, Nagoya (JP); Tsuneaki Ohashi, Ogaki (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 68 days.

(21) Appl. No.: 09/789,318

(22) Filed: Feb. 20, 2001

(65) Prior Publication Data

US 2001/0025001 A1 Sep. 27, 2001

(30) Foreign Application Priority Data

Feb. 21, 2000 (JP) ........................ 2000-043306

(51) Int. Cl.⁷ .................... C03C 3/06; C03C 14/00; C04B 35/14; C04B 35/596; C04B 35/577
(52) U.S. Cl. .................. 501/32; 501/54; 501/80; 501/87; 501/97.4; 501/133; 501/154
(58) Field of Search .............. 422/288; 501/11–32; 264/653–654, 660; 65/17.2, 17.3, 17.6

(56) References Cited

U.S. PATENT DOCUMENTS

| | | | | |
|---|---|---|---|---|
| 4,609,631 A | * | 9/1986 | Messier et al. | 501/35 |
| 5,180,694 A | * | 1/1993 | Renlund et al. | 264/125 |
| 5,389,582 A | * | 2/1995 | Loxley et al. | 432/262 |
| 6,012,304 A | * | 1/2000 | Loxley et al. | 264/653 |
| 6,355,587 B1 | * | 3/2002 | Loxley et al. | 264/653 |
| 6,399,526 B2 | * | 6/2002 | Tomita et al. | 219/385 |

* cited by examiner

Primary Examiner—David Sample
Assistant Examiner—Elizabeth A. Bolden
(74) Attorney, Agent, or Firm—Burr & Brown

(57) ABSTRACT

A composite material has a quartz glass phase and a complex compound phase compounded with the quartz glass phase, which is made of one or more compounds selected from a group of silicon carbide, silicon nitride, silicon, titanium nitride and titanium carbide, as a main ingredient. The composite material can be used instead of quartz glass, and can prevent the generations of microcrack, tipping and particles after the mechanical working.

8 Claims, No Drawings

COMPOSITE MATERIAL AND METHOD OF PRODUCING THE SAME

BACKGROUND OF THE INVENTION

1. Field of the Invention

The present invention relates to a composite material having an excellent workability and a method of producing the same.

2. Description of Related Art

Quartz glass is widely used for a construction member which is exposed to heat, since it has a high thermal shock resistance. Moreover, raw materials for quartz glass having a high purity can be easily obtained. Therefore, quartz glass having a high purity and including substantially no metal elements other than silicon can be easily produced. From this point of view, quartz glass is used for a technical field that is necessary to eliminate a contamination with the metal elements, especially for construction members in a semiconductor manufacturing apparatus.

In order to produce various kinds of construction members made of quartz glass, it is necessary to machine the raw materials made of quartz glass so as to obtain a predetermined shape. However, during the cutting operation, a tipping and a microcrack are liable to be generated on a surface region of quartz glass. As a result, there arises a tendency that fine particles are generated and adhered, and then remain on a surface of the construction member. Especially, in a field of the semiconductor manufacturing that is necessary to eliminate a contamination due to the particles, it is necessary to remove the particles. However, in order to remove the particles, it is necessary to perform a troublesome washing operation. In addition, in the case that a surface shape of the construction member is complicated, the particles is liable to remain even after the washing operation.

Moreover, in the semiconductor manufacturing apparatus, the construction member is exposed to a corrosive gas of halogen series and its plasma. In this case, if the microcrack or a tipping trace remains on a surface of quartz glass, corrosion might proceed from these portions and become a cause of a particle generation. In order to prevent such portions, it is necessary to eliminate the microcrack and the tipping trace by performing a complicated post-processing.

SUMMARY OF THE INVENTION

An object of the invention is to provide a composite material, which can prevent generations of microcrack and tipping after a machining operation and also a particle generation therefore, and which can be used instead of quartz glass having a heat resistance.

According to the invention, a composite material comprises; a quartz glass phase; and a complex compound phase compounded with the quartz glass phase, which is made of one or more compounds selected from a group of silicon carbide, silicon nitride, silicon, titanium nitride and titanium carbide, as a main ingredient.

Moreover, according to the invention, a method of producing a composite material, comprises the steps of: mixing a quartz glass powder and a compound powder made of one or more compounds selected from the group of silicon carbide, silicon nitride, silicon, titanium nitride and titanium carbide to obtain mixtures; forming the mixtures to obtain a formed body; and sintering the formed body at a temperature which is lower than the melting point of quartz glass and is lower than the melting point of the compound.

DESCRIPTION OF THE PREFERRED EMBODIMENT

The present invention relates to a composite material comprising; a quartz glass phase; and a complex compound phase compounded with the quartz glass phase, which is made of one or more compounds selected from a group of silicon carbide, silicon nitride, silicon, titanium nitride and titanium carbide, as a main ingredient.

The composite material mentioned above has a heat resistance and a thermal shock resistance as well as quartz glass. In addition, a microcrack and a tipping are not liable to be generated during a machining operation such as a cutting operation and so on, and particles are not liable to remain on a surface after the working.

As mentioned above, since the composite material according to the invention can prevent a particle generation after the working, the composite material according to the invention can be used preferably for a semiconductor manufacturing apparatus.

In the composite material, if the compound is made of silicon carbide, silicon nitride or silicon, metal elements other than silicon can be removed from a main components of the composite material. Therefore, the composite material having the compound mentioned above can be preferably used for a silicon semiconductor manufacturing apparatus.

It is preferred to set an amount of the quartz glass phase to larger than 10 wt %. Thereby, the composite material can maintain excellent heat resistance and thermal shock resistance. From this point of view, it is more preferred to set an amount of the quartz glass phase to larger than 50 wt %.

If an amount of the quartz glass phase is set to lower than 95 wt %, workability can be improved. In addition, if an amount of the quartz glass phase is lower than 85 wt %, strength of the composite material can be increased further.

Moreover, the compound may be made of silicon carbide, silicon, titanium nitride or titanium carbide. These compounds have a high conductivity (low volume resistivity) as compared with quartz glass. Therefore, if these compounds are added to the composite material, a conductivity of the composite material can be controlled.

However, even in the case that these compounds are added to the composite material, if an amount of the quartz glass phase is set to 80–95 wt %, there is a case that a volume resistivity of the composite material is higher than that of quartz glass. Since a volume resistivity of the compound mentioned above is lower than that of quartz glass, this result is amazing. The reason why is not clear.

If an amount of the quartz glass phase is lower than 78 wt %, the composite material can obtain a volume resistivity lower than quartz glass. In order to further lower the volume resistivity of the composite material, it is preferred to set an amount of the quartz glass phase to lower than 75 wt %, and more preferably lower than 70 wt %. The composite material having such a low volume resistivity can be preferably used for a field requiring a conductive property or a semiconductor property, to which the conventional quartz glass cannot be applied.

Moreover, if the composite material is relatively dense, the composite material can realize a strength and a young's modulus higher than those of quartz glass. Since the strength and the young's modulus of quartz glass are lower than those of ceramics such as alumina and so on, it is necessary to use a thicker construction member. Also from this point of view, the composite material according to the invention can be used advantageously as compared with quartz glass.

However, since the composite material according to the invention is produced by a powder sintering method mentioned below, there are two kinds of the composite materials, i.e., one is porous and the other is dense. In the case that the composite material is used as the construction member, it is necessary to have a predetermined strength and a predetermined young's modulus. Therefore, in order to obtain a strength and a young's modulus that are substantially equal to those of quartz glass, it is preferred to set an open porosity of the composite material to lower than 20 wt %. Moreover, in order to obtain a strength and a young's modulus that are considerably higher than those of quartz glass, it is preferred to set an open porosity of the composite material to lower than 15 wt %, more preferably 10 wt %.

Moreover, in a field, in which a contamination is disliked, such as a semiconductor manufacturing, it is preferred to set an amount of impurities other than quartz glass, elements constituting the compound and halogen to lower than 0.1 wt %, and also it is preferred to set an open porosity to lower than 5%.

In order to control metal impurities as mentioned above, the composite material according to the invention is advantageous. For example, ceramics raw materials such as alumina, aluminum nitride and so on are expensive if they are a high purity, and a sintering of them is difficult. On the other hand, in quartz glass that is a main ingredient of the composite material according to the invention, high purity raw materials can be obtained easily and inexpensively.

The composition material according to the invention can be preferably used for a member or a chamber in the semiconductor manufacturing apparatus or a liquid crystal display manufacturing apparatus, which is exposed to a corrosive gas. As for the members mentioned above, use is made of a heater, an electrode for electro-static chuck, a suscepter in which an electrode for a high frequency generation is embedded, a shaft or a rear plate connected to the suscepter, a shower plate, a doom, a roof and a ring member.

Moreover, if an amount of the quartz glass phase is 80–95 wt %, a volume resistivity of the composite material is large. Therefore, the composite material mentioned above can be used for a member requiring an insulation property such as a window for transmitting a microwave.

The composite material according to the invention can be obtained by mixing a quartz glass powder and a compound powder to obtain mixtures, forming the mixtures to obtain a formed body, and sintering the formed body at a temperature which is lower than a melting point of quartz glass and is lower than the melting point of the compound.

In a field in which no contamination with metal elements occurs, it is preferred to control a purity of the compound powder to a level higher than 99.9%. As for the silicon carbide and the silicon nitride to be used, both of α type and β type can be used. Moreover, it is preferred to control an average particle size of the compound powder to a level lower than 10 μm, more preferably lower than 3 μm.

It is preferred to control a purity of the quartz glass powder to a level higher than 99.9%. A producing method of the quartz glass powder is not limited, and use is made of a crushing method, a chemical vapor deposition method and an atomizing method. It is preferred to control an average particle size of the quartz glass powder to a level lower than 10 μm, more preferable lower than 3 μm.

When the mixtures are formed, an organic binder can be used. Moreover, it is possible to form a granulation powder obtained by a spray-dry method.

An atmosphere during the sintering operation may be vacuum, argon atmosphere, normal atmosphere or nitride atmosphere. Here, in order to reduce an open porosity of the composite material, it is preferred to use a vacuum atmosphere preferably lower than 1.0 Torr.

During the sintering operation, a little amount of crystobalite phase is sometimes generated. In order to prevent a crystobalite phase generation, it is preferred to control an uppermost temperature during the sintering to a level lower than 1550° C., more preferably lower than 1500° C., most preferably lower than 1450° C. Moreover, in order to proceed the sintering, it is preferred to control the uppermost temperature during the sintering operation to a level higher than 1300° C.

Moreover, in order to suppress the crystobalite phase generation, it is preferred to control a temperature ascending rate and a temperature descending rate between 1100° C. and the uppermost temperature during the sintering operation to a level between 200° C./hour and 1000° C./hour.

From the view point that a density of the composite material is improved and the crystobalite phase generation is suppressed, it is preferred to apply a pressure to the formed body during the sintering. As to a pressure applying method, use is made of a hot pressing method and a hot isostatic pressing method. It is preferred to control an axial pressure to be applied to a level larger than 10 MPa. An upper limit of the axial pressure is limited only by a limit of the pressing machine used.

Hereinafter, an actual experiment will be explained.

Experiment

Use was made of a beta type silicon carbide powder having an average particle size of 2.1 μm. A total amount of impurities other than silicon and carbon in this powder was not larger than 100 ppm. Moreover, use was made of a quartz glass powder having an average particle size of 0.6 μm grade. Both powders were measured and mixed with each other without adding an organic binder to obtain mixtures. A mixing rate was shown in Table 1–Table 3. Then, the mixtures were formed by a uniaxial pressing apparatus to obtain a formed body with a disc shape having a thickness of 5 mm and a diameter of 100 mm. The thus obtained formed body was accommodated in the hot pressing apparatus, and a hot pressing operation was performed. The hot pressing apparatus had a furnace member made of carbon and an exhaust apparatus using a diffusion pump. In this case, the temperature ascending rate and the temperature descending rate between 1100° C. and the uppermost temperature was 400° C./hour, and a temperature keeping time at the uppermost temperature was 30 minutes. The uppermost temperature, the atmosphere during the sintering and the pressing pressure were shown in Table 1 –Table 3, respectively.

A surface of respective sintered bodies was ground by a whetstone of #800, and the ground surface was observed by a naked eye and a microscope. When the tipping or the microcrack was detected, a symbol "no good" was described in Table 1–Table 3, and when it was not detected, a symbol "good" was described therein. Moreover, the open porosity was measured by Archimedes method, and the volume resistivity was measured by a three terminal method. Further, the bending strength was measured by a four-points bending method at room temperature defined by JIS R1601.

In addition, sintered bodies using compounds such as silicon (Si), silicon nitride ($Si_3N_4$), titanium nitride (TiN) and titanium carbide (TiC) other than silicon carbide were produced according to the same method mentioned above and various properties of them were measured in the same manner as mentioned above. The results were shown in Table 4. In this case, in the examples 16 and 17, use was made of the Si powder having an average particle size of 0.9 $\mu$m and a purity of 99.99%. In the examples 18 and 19, use was made of the $Si_3N_4$ powder having an average particle size of 45 $\mu$m as a granulated powder after a spray-dry (0.5 $\mu$m as a primary powder) and impurities of less than 100 ppm other than Si and N. In the examples 20 and 21, use was made of the TiN powder having an average particle size of 1.2 $\mu$m and a purity of 99.99%. In the examples 22 and 23, use was made of the TiC powder having an average particle size of 1.0 $\mu$m and a purity of 99.99%. Moreover, in the case that use was made of $N_2$ atmosphere, a pressure was 2 atm.

TABLE 1

| | Example 1 | Example 2 | Example 3 | Example 4 | Example 5 | Example 6 | Example 7 |
|---|---|---|---|---|---|---|---|
| Amount of quartz glass (wt %) | 60 | 50 | 40 | 80 | 60 | 50 | 40 |
| Amount of silicon carbide (wt %) | 40 | 50 | 60 | 20 | 40 | 50 | 60 |
| Uppermost temperature during sintering (° C.) | 1300 | 1300 | 1300 | 1500 | 1500 | 1500 | 1500 |
| Press pressure (MPa) | 20 | 20 | 20 | 40 | 40 | 40 | 40 |
| Atmosphere during sintering | vacuum | vacuum | vacuum | vacuum | vacuum | vacuum | vacuum |
| Workability | good | good | good | good | good | good | good |
| Open porosity (%) | 13 | 19 | 20 | 0 | 0 | 0 | 4 |
| Bending strength (MPa) | 140 | 80 | 70 | 190 | 330 | 280 | 110 |
| Volume resistivity ($\Omega \cdot cm$) room temperature | $4 \times 10^8$ | $<1 \times 10^7$ | $<1 \times 10^7$ | $6 \times 10^{16}$ | $<1 \times 10^7$ | $<1 \times 10^7$ | $<1 \times 10^7$ |
| Volume resistivity ($\Omega \cdot cm$) 200° C. | $5 \times 10^8$ | $<1 \times 10^7$ | $<1 \times 10^7$ | $1 \times 10^{14}$ | $<1 \times 10^7$ | $<1 \times 10^7$ | $<1 \times 10^7$ |

TABLE 2

| | Comparative Example 1 | Comparative Example 2 | Example 8 | Example 9 | Example 10 | Example 11 |
|---|---|---|---|---|---|---|
| Amount of quartz glass (wt %) | 100 | 100 | 95 | 80 | 76 | 72 |
| Amount of silicon carbide (wt %) | 0 | 0 | 5 | 20 | 24 | 28 |
| Uppermost temperature during sintering (° C.) | melt | 1550 | 1400 | 1400 | 1400 | 1400 |
| Press pressure (MPa) | 0 | 0 | 20 | 20 | 20 | 20 |
| Atmosphere during sintering | normal atmosphere | vacuum | vacuum | vacuum | vacuum | vacuum |
| Workability | no good | no good | good | good | good | good |
| Open porosity (%) | 0 | 3 | 0 | 0 | 0 | 0 |
| Bending strength (MPa) | 70 | 90 | 120 | 120 | 130 | 170 |
| Volume resistivity ($\Omega \cdot cm$) room temperature | $1 \times 10^{13}$ | $1 \times 10^{11}$ | $8 \times 10^{16}$ | $6 \times 10^{16}$ | $4 \times 10^{12}$ | $1 \times 10^9$ |
| Volume resistivity ($\Omega \cdot cm$) 200° C. | $1 \times 10^{11}$ | $1 \times 10^{13}$ | $4 \times 10^{14}$ | $1 \times 10^{13}$ | $5 \times 10^9$ | $2 \times 10^7$ |

TABLE 3

| | Example 12 | Example 13 | Example 14 | Example 15 | Comparative Example 3 | Comparative Example 4 |
|---|---|---|---|---|---|---|
| Amount of quartz glass (wt %) | 66 | 60 | 50 | 30 | 0 | 60 |
| Amount of silicon carbide (wt %) | 34 | 40 | 50 | 70 | 100 | 40 |
| Uppermost temperature during sintering (° C.) | 1400 | 1400 | 1400 | 1400 | 1600 | 1650 |
| Press pressure (MPa) | 20 | 20 | 20 | 20 | 20 | 0 |
| Atmosphere during sintering | vacuum | vacuum | vacuum | vacuum | vacuum | vacuum |
| Workability | good | good | no good | good | — | — |
| Open porosity (%) | 0 | 0 | 2 | 16 | — | — |
| Bending strength (MPa) | 200 | 180 | 140 | 100 | — | — |
| Volume resistivity ($\Omega \cdot cm$) room temperature | $<1 \times 10^7$ | $<1 \times 10^7$ | $<1 \times 10^7$ | $<1 \times 10^7$ | — | — |
| Volume resistivity ($\Omega \cdot cm$) 200° C. | $<1 \times 10^7$ | $<1 \times 10^7$ | $<1 \times 10^7$ | $<1 \times 10^7$ | — | — |

TABLE 4

| | Example 16 | Example 17 | Example 18 | Example 19 | Example 20 | Example 21 | Example 22 | Example 23 |
|---|---|---|---|---|---|---|---|---|
| Amount of quartz glass (wt %) | 85 | 60 | 85 | 60 | 85 | 60 | 85 | 60 |
| Amount of compound (wt %) | Si 15 | Si 40 | $Si_3N_4$ 15 | $Si_3N_4$ 40 | TiN 15 | TiN 40 | TiC 15 | TiC 40 |
| Upper most temperature during sintering (° C.) | 1400 | 1400 | 1500 | 1500 | 1450 | 1450 | 1450 | 1450 |
| Press pressure (MPa) | 20 | 40 | 20 | 40 | 20 | 40 | 20 | 40 |
| Atmosphere during sintering | vacuum | vacuum | $N_2$ | $N_2$ | $N_2$ | $N_2$ | vacuum | vacuum |
| Workability | good | good | good | good | good | good | good | good |
| Openporosity (%) | 1 | 5 | 4 | 11 | 1 | 8 | 1 | 8 |
| Bending strength (MPa) | 210 | 160 | 180 | 100 | 250 | 150 | 270 | 130 |
| Volume resistivity ($\Omega \cdot cm$) room temperature | $2 \times 10^{16}$ | $7 \times 10^8$ | $6 \times 10^{16}$ | $4 \times 10^{16}$ | $1 \times 10^{14}$ | $3 \times 10^8$ | $1 \times 10^{15}$ | $1 \times 10^8$ |
| 200° C. | $8 \times 10^{13}$ | $<1 \times 10^7$ | $6 \times 10^{14}$ | $3 \times 10^{14}$ | $2 \times 10^{10}$ | $<1 \times 10^7$ | $2 \times 10^{12}$ | $1 \times 10^7$ |

In the examples 1–3, the uppermost temperature during the sintering was 1300° C. As compared with the comparative examples 1 and 2 that were made of quartz glass, the workability was improved and respective volume resistivities at room temperature and 200° C. were lowered. Moreover, in the composite materials according to the example 1 having the open porosity of 13%, the bending strength was extraordinarily improved as compared with quartz glass.

In the examples 4–7, the uppermost temperature during the sintering was 1500° C., and the pressing pressure was 40 MPa. As a result, in all of them, the bending strength was extraordinarily improved as compared with the comparative examples 1 and 2. Further, in the examples 5, 6 and 7, the volume resistivity was lowered due to a function of the silicon carbide phase. However, in the example 4, it was understood that the volume resistivity was increased.

In the examples 8–15, the uppermost temperature during the sintering was 1400° C., and an amount of quartz glass was varied respectively. In the examples 8 and 9, the composite material having a high volume resistivity was obtained. In the examples 10–15, the volume resistivity was lowered. Moreover, in all the examples 8–15, the open porosity was low, and the bending strength was relatively large.

In the comparative example 3 in which use was made of the silicon carbide only, the sintering operation was performed at 1600° C., but the powder was not sufficiently sintered. In the comparative example 4, the mixtures of the quartz glass powder and the silicon carbide powder were sintered at 1650° C. without applying the pressing pressure, but the mixtures were not sufficiently sintered under such a condition.

In the examples 16–23 in which various kinds of compounds other than silicon carbide were used, excellent properties substantially equal to these of the examples 1–15 could be obtained.

As mentioned above, according to the invention, it is possible to provide the composite material used instead of quartz glass, which can prevent the generations of microcrack, tipping and particles after the mechanical working.

What is claimed is:

1. A composite material comprising; a quartz glass phase; and a complex compound phase compounded with the quartz glass phase, which is made of one or more compounds selected from a group of silicon carbide, silicon nitride, silicon, titanium nitride and titanium carbide, as a main ingredient.

2. The composite material according to claim 1, wherein an amount of the quartz glass phase is 10–95 wt %.

3. The composite material according to claim 2, wherein an amount of the quartz glass phase is 80–95 wt %.

4. The composite material according to claim 1, wherein the compound is selected from a group of silicon carbide, silicon nitride and silicon.

5. The composite material according to claim 1, wherein the compound is selected from a group of silicon carbide, silicon, titanium nitride and titanium carbide.

6. The composite material according to claim 1, wherein an open porosity is lower than 15%.

7. The composite material according to claim 6, wherein a total amount of impurities other than quartz glass, elements constituting the compound and halogen is lower than 0.1 wt %, and an open porosity is lower than 5%.

8. A method of producing a composite material, comprising the steps of:

mixing a quartz glass powder and a compound powder made of one or more compounds selected from the group of silicon carbide, silicon nitride, silicon, titanium nitride and titanium carbide to obtain mixtures;

forming the mixtures to obtain a formed body; and sintering the formed body at a temperature which is lower than the melting point of quartz glass and is lower than the melting point of the compound.

* * * * *